United States Patent
Arndt et al.

(10) Patent No.: US 9,051,980 B2
(45) Date of Patent: Jun. 9, 2015

(54) DIRECTION SELECTABLE SPRAG

(71) Applicant: GM Global Technology Operations LLC, Detroit, MI (US)

(72) Inventors: Randal William Arndt, White Lake, MI (US); Douglas John Dwenger, Plymouth, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 123 days.

(21) Appl. No.: 13/871,699

(22) Filed: Apr. 26, 2013

(65) Prior Publication Data

US 2014/0318923 A1   Oct. 30, 2014

(51) Int. Cl.
*F16D 41/07* (2006.01)
*F16D 41/08* (2006.01)
*F16D 41/069* (2006.01)

(52) U.S. Cl.
CPC ............ *F16D 41/084* (2013.01); *F16D 41/069* (2013.01); *F16D 41/07* (2013.01)

(58) Field of Classification Search
CPC ....... F16D 41/06; F16D 41/08; F16D 41/084; F16D 41/069
USPC ................................ 192/45.1, 41 A, 43.1, 47
See application file for complete search history.

(56) References Cited

U.S. PATENT DOCUMENTS

| | | | |
|---|---|---|---|
| 3,599,767 A * | 8/1971 | Sederquist | 192/43.1 |
| 3,961,545 A | 6/1976 | Petresh et al. | |
| 3,974,713 A | 8/1976 | Toohey | |
| 4,020,634 A | 5/1977 | Bradley | |
| 4,173,270 A | 11/1979 | Croswhite et al. | |
| 4,430,908 A | 2/1984 | Stockton | |
| 4,463,621 A | 8/1984 | Fisher | |
| 4,493,387 A | 1/1985 | Lake et al. | |
| 4,615,227 A | 10/1986 | Stockton | |
| 4,718,295 A | 1/1988 | Jesena | |
| 4,836,049 A | 6/1989 | Moan | |
| 4,855,914 A | 8/1989 | Davis et al. | |
| 4,856,369 A | 8/1989 | Stockton | |
| 4,865,109 A | 9/1989 | Sherman | |
| 4,911,273 A * | 3/1990 | Kinoshita et al. | 192/41 A |
| 4,928,227 A | 5/1990 | Burba et al. | |
| 5,073,156 A | 12/1991 | Garrett et al. | |
| 5,129,871 A | 7/1992 | Sandel et al. | |
| 5,131,902 A | 7/1992 | Pierce | |
| 5,167,593 A | 12/1992 | Pierce | |
| 5,234,389 A | 8/1993 | Goates | |

(Continued)

OTHER PUBLICATIONS

Pending U.S. Appl. No. 13/627,532, filed Sep. 26, 2012, by Diemer et al. All pages.

(Continued)

*Primary Examiner* — Ramya Burgess
*Assistant Examiner* — Lillian Nguyen

(57) ABSTRACT

A torque transmitting device for use in an automotive transmission is provided. The device includes an inner annular race and an outer annular race disposed concentrically around the inner annular race. A selector plate is disposed adjacent to the inner and outer annular races, the selector plate being movable with respect to the inner and outer races. Multiple control elements are pivotally connected to the selector plate. The control elements are disposed between the inner and outer races. A plurality of sprag elements is disposed between the inner and outer races. Each sprag element is disposed adjacent to a control element.

6 Claims, 7 Drawing Sheets

(56) References Cited

U.S. PATENT DOCUMENTS

| | | |
|---|---|---|
| 5,250,011 A | 10/1993 | Pierce |
| 5,267,913 A | 12/1993 | Beim et al. |
| 5,267,916 A | 12/1993 | Beim et al. |
| 5,295,924 A | 3/1994 | Beim |
| 5,435,792 A | 7/1995 | Justice et al. |
| 5,449,057 A | 9/1995 | Frank |
| 5,474,164 A | 12/1995 | Berger |
| 5,518,092 A | 5/1996 | Ma |
| 5,595,273 A | 1/1997 | Endoy et al. |
| 5,597,057 A | 1/1997 | Ruth et al. |
| 5,692,988 A | 12/1997 | Beim et al. |
| 5,700,218 A | 12/1997 | VanSelous et al. |
| 5,755,636 A | 5/1998 | Justice et al. |
| 5,800,304 A | 9/1998 | Beim et al. |
| 5,823,909 A | 10/1998 | Beim et al. |
| 5,871,071 A | 2/1999 | Sink |
| 6,065,576 A | 5/2000 | Shaw et al. |
| 6,092,634 A | 7/2000 | Kremer et al. |
| 6,109,410 A | 8/2000 | Costin |
| 6,116,394 A | 9/2000 | Ruth |
| 6,125,979 A | 10/2000 | Costin et al. |
| 6,125,980 A | 10/2000 | Ruth et al. |
| 6,186,299 B1 | 2/2001 | Ruth |
| 6,193,038 B1 | 2/2001 | Scott et al. |
| 6,210,300 B1 | 4/2001 | Costin et al. |
| 6,260,543 B1 | 7/2001 | Chih |
| 6,333,112 B1 | 12/2001 | Field et al. |
| 6,338,403 B1 | 1/2002 | Costin et al. |
| 6,505,721 B1 | 1/2003 | Welch |
| 6,554,113 B2 | 4/2003 | Li et al. |
| 6,571,926 B2 | 6/2003 | Pawley |
| 6,634,866 B2 | 10/2003 | Vukovich et al. |
| RE38,498 E | 4/2004 | Ruth et al. |
| 6,830,531 B1 | 12/2004 | Koenig et al. |
| 6,854,577 B2 | 2/2005 | Ruth |
| 6,905,435 B2 | 6/2005 | Nielsen |
| 6,908,408 B2 | 6/2005 | Nielsen |
| 6,953,412 B2 | 10/2005 | Braford et al. |
| 7,100,756 B2 | 9/2006 | Kimes et al. |
| 7,198,586 B2 | 4/2007 | Brooks et al. |
| 7,223,198 B2 | 5/2007 | Kimes et al. |
| 7,354,375 B2 | 4/2008 | Brooks et al. |
| 7,383,930 B2 | 6/2008 | Kimes et al. |
| 7,448,481 B2 | 11/2008 | Kimes et al. |
| 7,451,862 B2 | 11/2008 | Kimes et al. |
| 7,455,156 B2 | 11/2008 | Kimes et al. |
| 7,484,605 B2 | 2/2009 | Pawley et al. |
| 7,661,518 B2 | 2/2010 | Kimes |
| 7,699,746 B2 | 4/2010 | Maguire et al. |
| 7,878,316 B2 | 2/2011 | Joppeck |
| 7,962,278 B1 | 6/2011 | Patterson et al. |
| 8,105,194 B2 | 1/2012 | Smart |
| 8,105,195 B2 | 1/2012 | Wigsten |
| 8,195,380 B2 | 6/2012 | Patterson et al. |
| 8,226,509 B2 | 7/2012 | Smart |
| 8,276,725 B2 | 10/2012 | Swales et al. |
| 8,292,055 B2 | 10/2012 | Wilton et al. |
| 8,297,424 B2 | 10/2012 | Bradley |
| 8,357,069 B2 | 1/2013 | Diemer et al. |
| 8,371,984 B2 | 2/2013 | Diemer et al. |
| 8,376,900 B2 | 2/2013 | Heitzenrater et al. |
| 8,403,123 B2 | 3/2013 | Bird et al. |
| 8,418,825 B2 | 4/2013 | Bird |
| 8,442,748 B2 | 5/2013 | Patterson et al. |
| 8,449,423 B2 | 5/2013 | Wilton et al. |
| 8,464,851 B2 | 6/2013 | Moorman |
| 8,491,440 B2 | 7/2013 | Kimes et al. |
| 8,500,590 B2 | 8/2013 | Showalter |
| 8,506,445 B2 | 8/2013 | Wittkopp et al. |
| 8,561,502 B2 | 10/2013 | Schultz |
| 8,561,772 B2 | 10/2013 | Papania et al. |
| 8,578,803 B2 | 11/2013 | Neelakantan et al. |
| 2002/0108831 A1 | 8/2002 | Pawley |
| 2003/0034217 A1 | 2/2003 | Costin et al. |
| 2003/0051960 A1 | 3/2003 | Li et al. |
| 2004/0216975 A1 | 11/2004 | Ruth |
| 2005/0059526 A1 | 3/2005 | Nielsen |
| 2005/0059527 A1 | 3/2005 | Nielsen |
| 2006/0021835 A1 | 2/2006 | Kimes et al. |
| 2006/0021836 A1 | 2/2006 | Kimes et al. |
| 2006/0021837 A1 | 2/2006 | Kimes et al. |
| 2006/0021838 A1 | 2/2006 | Kimes et al. |
| 2006/0021839 A1 | 2/2006 | Kimes et al. |
| 2006/0021840 A1 | 2/2006 | Kimes et al. |
| 2006/0021841 A1 | 2/2006 | Kimes et al. |
| 2006/0025279 A1 | 2/2006 | Kimes et al. |
| 2006/0128519 A1 | 6/2006 | Brooks et al. |
| 2006/0278487 A1 | 12/2006 | Pawley et al. |
| 2007/0131509 A1 | 6/2007 | Kimes |
| 2008/0135369 A1 | 6/2008 | Meier |
| 2008/0163842 A1 | 7/2008 | Forssell et al. |
| 2008/0217131 A1 | 9/2008 | Wittkopp et al. |
| 2009/0032352 A1 | 2/2009 | Pritchard et al. |
| 2009/0151684 A1 | 6/2009 | Gast et al. |
| 2009/0241291 A1 | 10/2009 | Smart |
| 2009/0266667 A1* | 10/2009 | Samie et al. ................ 192/43.1 |
| 2009/0277738 A1 | 11/2009 | Papania et al. |
| 2009/0308198 A1 | 12/2009 | Jastrzembowski et al. |
| 2009/0325749 A1 | 12/2009 | Wigsten |
| 2010/0029435 A1 | 2/2010 | Kimes et al. |
| 2010/0230226 A1 | 9/2010 | Prout |
| 2010/0288592 A1 | 11/2010 | Papania et al. |
| 2011/0030493 A1 | 2/2011 | Koenig et al. |
| 2011/0132307 A1 | 6/2011 | Patterson et al. |
| 2011/0167955 A1 | 7/2011 | Pritchard et al. |
| 2011/0232596 A1 | 9/2011 | Patterson et al. |
| 2011/0269587 A1 | 11/2011 | Papania |
| 2011/0290608 A1 | 12/2011 | Bird et al. |
| 2011/0303049 A1 | 12/2011 | Neelakantan et al. |
| 2011/0319214 A1 | 12/2011 | Showalter |
| 2012/0094792 A1 | 4/2012 | Smart |
| 2012/0103745 A1 | 5/2012 | Bird |
| 2012/0145505 A1 | 6/2012 | Kimes |
| 2012/0145508 A1 | 6/2012 | Dziurda et al. |
| 2012/0178568 A1 | 7/2012 | Schoenek et al. |
| 2012/0178569 A1 | 7/2012 | Grochowski et al. |
| 2012/0245831 A1 | 9/2012 | Patterson et al. |
| 2012/0252626 A1 | 10/2012 | Robinette |
| 2012/0316029 A1 | 12/2012 | Nedorezov et al. |
| 2013/0248314 A1 | 9/2013 | Dziurda |

OTHER PUBLICATIONS

Pending U.S. Appl. No. 13/746,863, filed Jan. 22, 2013, by Holmes. All pages.

Pending U.S. Appl. No. 13/782,669, filed Mar. 1, 2013, by Hart et al. All pages.

* cited by examiner

DIRECTION SELECTABLE SPRAG

FIELD

The present disclosure relates to a torque transmitting component for an automatic transmission, and more particularly, to a selectable one-way torque transmitting device.

BACKGROUND

The statements in this section merely provide background information related to the present disclosure and may not constitute prior art.

There are many devices for transmitting torque known in the art. Examples include hydraulically actuated clutch plates, dog clutches actuated by shift forks, one-way clutches, and selectable one-way clutches. These devices are able to transmit torque between two separate components, and each is useful for its intended purpose.

The one-way clutch is used in many applications for transmitting torque in one rotational direction. A typical one-way clutch may include an inner ring disposed within an outer ring. A connecting member is located between the rings for selectively transmitting torque between the rings. The connecting member may take various forms, for example, a sprag, roller, or rocker. The connecting member acts to engage the rings in order to transmit torque when one of the rings is rotated in a first direction relative to the other of the rings. If the rings are rotated in an opposite relative direction, the connecting member does not engage the rings, and torque is not transmitted through the one-way clutch. In this way the one-way clutch is effective in transmitting torque between two components.

One type of brake or clutch useful in automatic transmissions is known as a selectable one-way clutch, which allows different torque settings to be selected. For example, a selectable one-way clutch may include one setting to function as a one-way clutch and another setting which allows the inner ring and the outer ring to rotate freely relative to one another in both directions. In another example, a selectable one-way clutch may include one setting to function as a one-way clutch and another setting which allows torque to be transmitted between the inner ring and the outer ring in both directions. A selectable one-way clutch is similar to a basic one-way clutch, which includes a "locked" mode in one rotational direction and a "freewheel" mode in the opposite rotational direction. In the basic one-way clutch, the operating mode is determined by the direction of the torque being applied to the input member. A selectable one-way clutch is further capable of producing a driving connection between an input member and an output member in one or both rotational directions and is also able to freewheel in one or both rotational directions as needed. As an example, a selectable one-way clutch may be implemented to transfer torque from an engine to the transmission, and to interrupt the transfer of reverse torque from the transmission to the engine.

Selectable one-way clutches in automatic transmissions may employ a high pressure hydraulic control system that is used to actuate the selectable one-way clutch. However, there are applications, such as hybrid electric vehicles, that may not otherwise require a high pressure hydraulic control system. Selectable one-way clutches work for their intended purpose, but it is desirable to improve the efficiency and lower the cost of selectable one-way clutches.

SUMMARY

In one variation, which may be combined with or separate from the other variations described herein, a torque transmitting device for use in an automotive transmission is provided. The torque transmitting device includes an inner annular race and an outer annular race disposed concentrically around the inner annular race. A selector is disposed adjacent to the inner and outer annular races, and the selector is movable with respect to the inner and outer races. A plurality of control elements is provided, and each control element is pivotally connected to the selector. The control elements are disposed between the inner and outer races. A plurality of sprag elements is disposed between the inner and outer races. Each sprag element is disposed adjacent to a control element of the plurality of control elements.

In another variation, which may be combined with or separate from the other variations described herein, a torque transmitting device for use in an automotive transmission is provided. The torque transmitting device includes an inner annular race and an outer annular race disposed concentrically around the inner annular race. A selector plate is disposed adjacent to the inner and outer annular races, and the selector plate is movable with respect to the inner and outer races. Flexible control elements are pivotally connected to the selector plate. Each control element is disposed between the inner and outer races, and each control element has a first convex side and a second convex side. Multiple plate pivot pins and race pivot pins are also provided. Each plate pivot pin connects a control element to the selector plate. Each race pivot pin connects a control element to one of the inner and outer races. Sprag elements are disposed between the inner and outer races. Each sprag element is disposed adjacent to a control element. The sprag elements are continuously fixed for common rotation with one of the inner and outer races. The sprag elements are selectively interconnectable with the other of the inner and outer races. Each sprag element has a first concave side and a second concave side. Each of the first and second convex sides of the control elements are disposed adjacent to and contacting one of the first and second concave sides of the sprag elements. The selector plate is configured to be rotated in a first direction to decouple the sprag elements from one of the outer and inner races, and the selector plate is configured to be rotated in a second direction to couple the inner and outer races together. The second direction is opposite the first direction.

In yet another variation, which may be combined with or separate from the other variations described herein, a torque transmitting device for use in an automotive transmission is provided. The torque transmitting device includes an inner annular race and an outer annular race disposed concentrically around the inner annular race. The inner and outer annular races define an annular channel therebetween. A selector plate is disposed adjacent to the inner and outer annular races, and the selector plate is movable with respect to the inner and outer races. A plurality of flexible control elements is pivotally connected to the selector plate, and each control element is disposed between the inner and outer races. Each control element has a first convex side and a second convex side. A plurality of plate pivot pins is also provided. Each plate pivot pin connects a control element of the plurality of control elements to the selector plate.

A plurality of sprag elements is disposed between the inner and outer races. Each sprag element is disposed adjacent to a control element of the plurality of control elements. The plurality of sprag elements is continuously fixed for common rotation with one of the inner and outer races, and the plurality of sprag elements is selectively interconnectable with the other of the inner and outer races. Each sprag element has a first concave side and a second concave side. Each of the first and second convex sides of the control elements are disposed adjacent to and contacting one of the first and second concave sides of the sprag elements. One of the first and second concave sides of each sprag elements is disposed adjacent to an extension of the plurality of extensions. A plurality of extensions extends into the channel from one of the first and second races. Each extension has a first sprag element disposed on a first side of the extension and a second sprag element disposed on a second side of the extension. A plurality of springs is disposed in the channel. Each spring extends between a sprag element and an extension. The selector plate is configured to be rotated in a first direction to decouple the sprag elements from one of the outer and inner races, and the selector plate is configured to be rotated in a second direction to couple the inner and outer races together. The second direction is opposite the first direction.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1A:
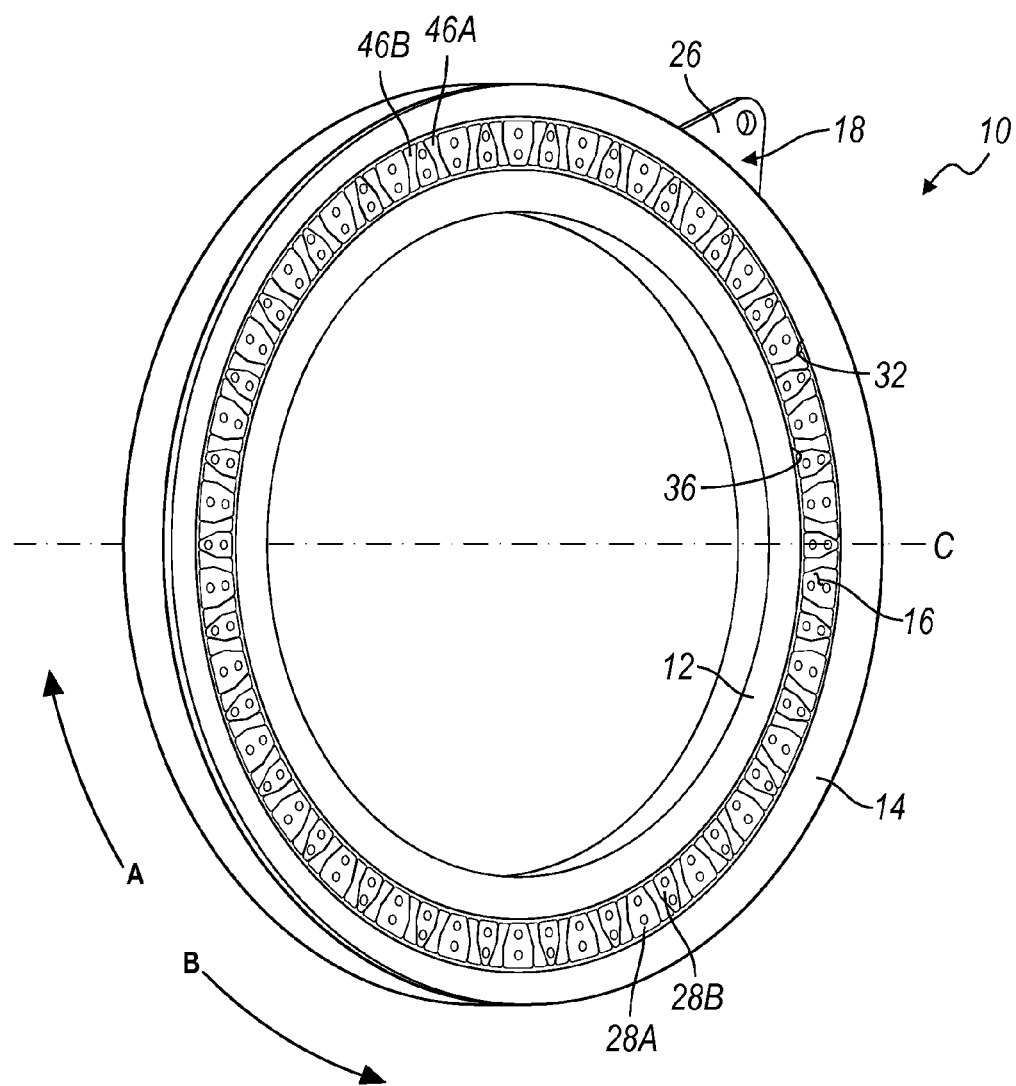
FIG. 1A is a perspective view of a first side of a torque transmitting mechanism according to the principles of the present disclosure.
Figure 1B:
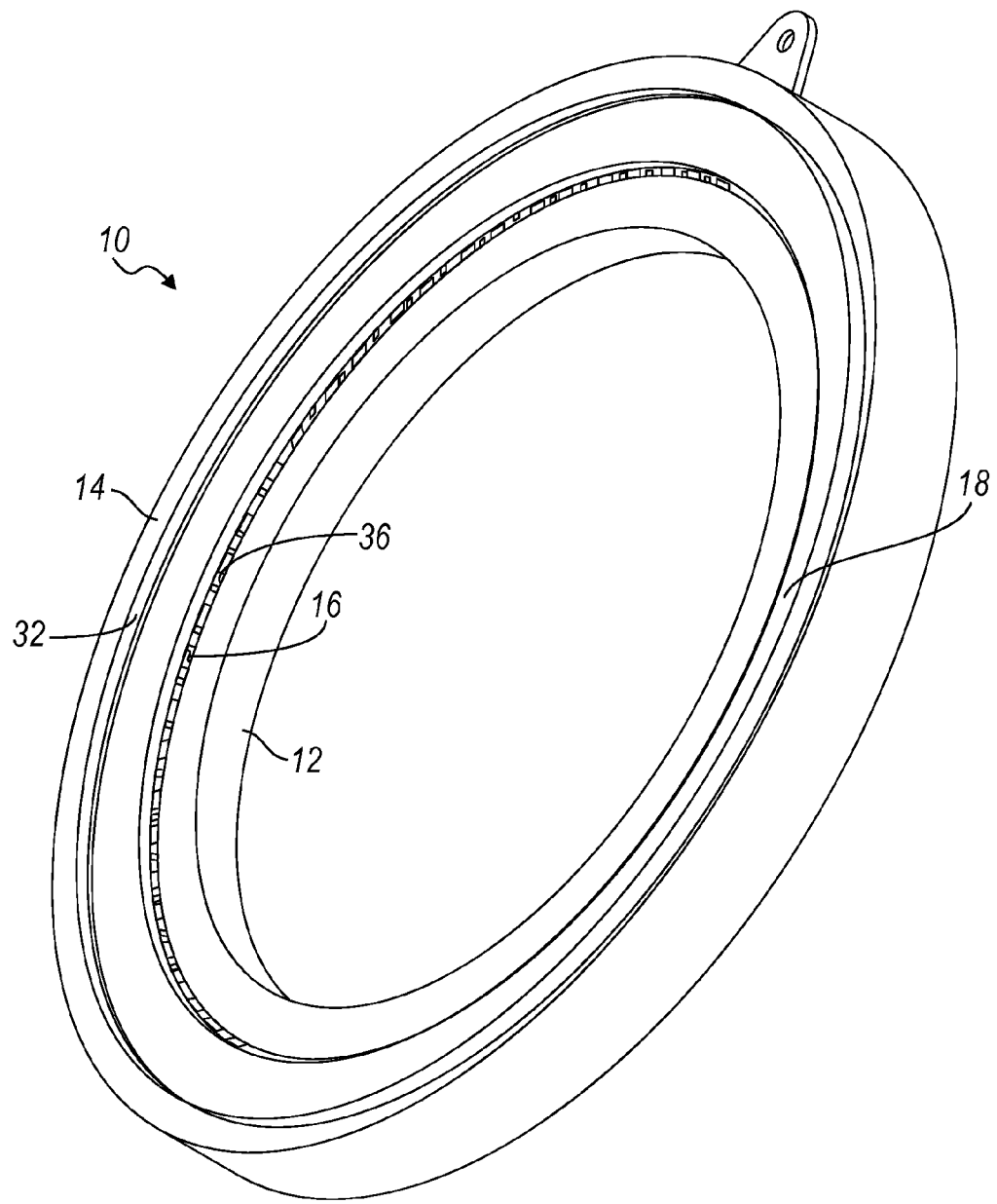
FIG. 1B is a perspective view of a second side of the torque transmitting mechanism of FIG. 1A, in accordance with the principles of the present disclosure.
Figure 1C:
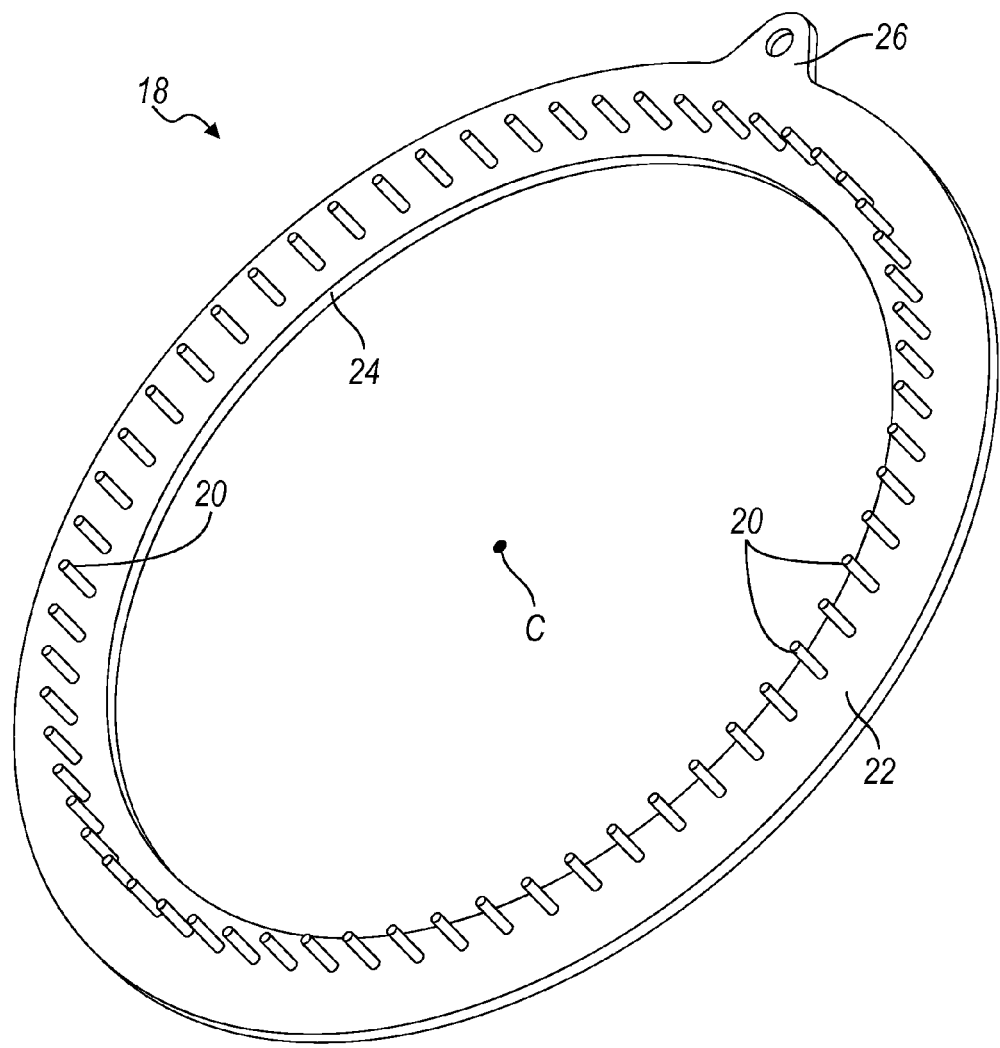
FIG. 1C is a perspective view of a selector plate of the torque transmitting mechanism of FIGS. 1A-1B, according to the principles of the present disclosure.
Figure 1D:
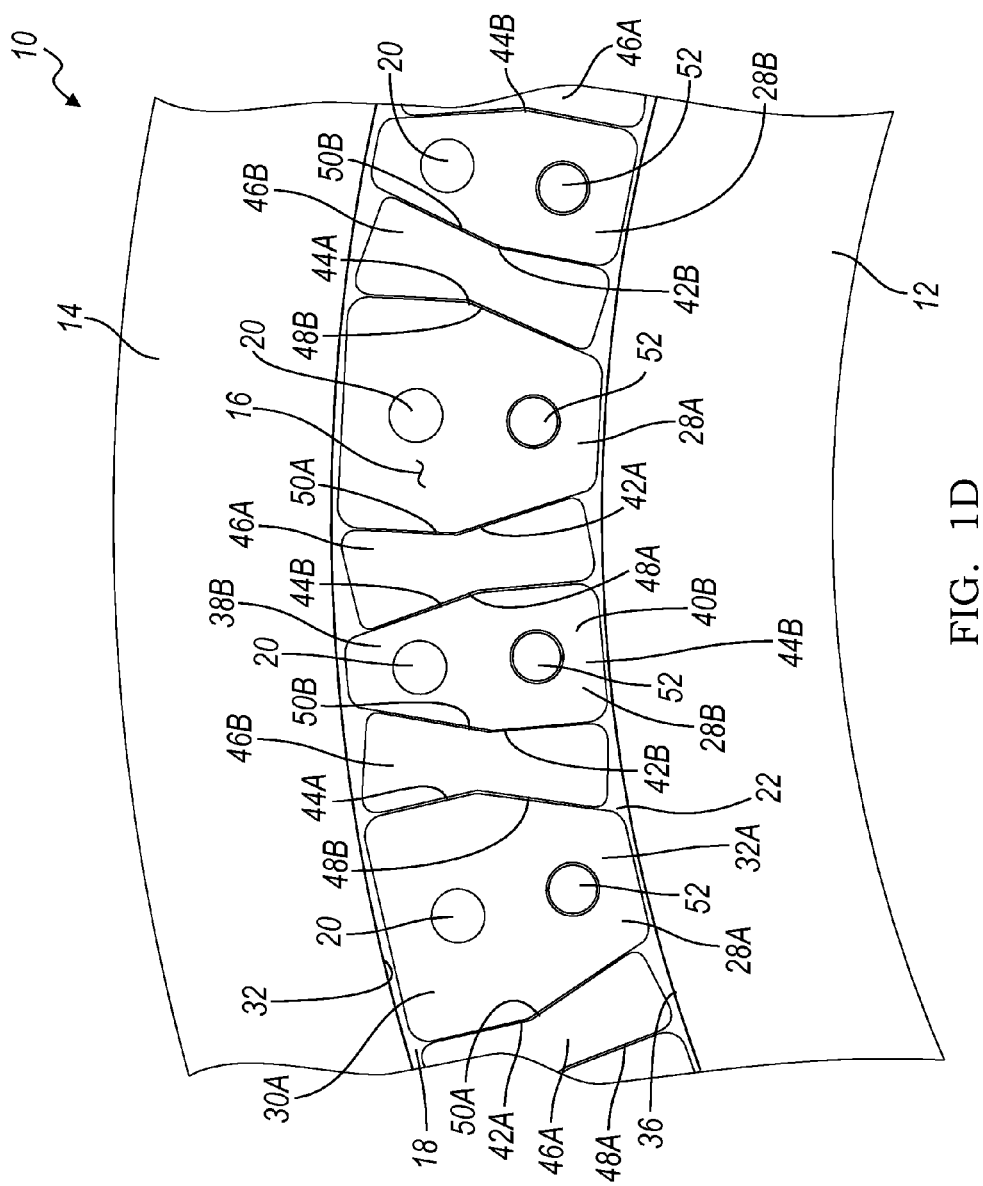
FIG. 1D is a side view of a portion of the first side of the torque transmitting mechanism of FIGS. 1A-1C, in accordance with the principles of the present disclosure.

The following description is merely exemplary in nature and is not intended to limit the present disclosure, application, or uses.

With reference to FIGS. 1A-1D, a selectable one-way torque transmitting mechanism or device is schematically and cross-sectionally illustrated and generally designated at 10. The selectable one-way torque transmitting mechanism 10 may be used as a clutch or a brake in an automotive transmission. The torque transmitting mechanism 10 includes an annular inner race 12. The torque transmitting device 10 also includes an outer race 14 disposed radially outward from the inner race 12. The outer race 14 is disposed concentrically around the inner race 12. The outer race 14 also has a generally annular shape. The inner and outer annular races 12, 14 define an annular channel 16 therebetween.

A selector, such as a selector plate 18, is disposed adjacent to the inner and outer annular races 12, 14. The selector plate 18 may be located generally between the inner and outer races 12, 14, or in the channel 16 defined between the inner and outer races 12, 14. The selector plate 18 is movable with respect to the inner and outer races 12, 14. The selector plate 18 has a generally annular shape. A plurality of plate pivot pins 20 extend from a face 22 of the selector plate 18. In the illustrated embodiment, the pivot pins 20 are spaced apart adjacent to an inner edge 24 of the annular selector plate 18, along the inner circumference of the selector plate 18. A tab 26 may extend from the selector plate 18 for moving the selector plate 18 with respect to the inner and outer races 12, 14. For example, the selector plate 18 may be rotated slightly about a central axis C, which will be described in further detail below. The tab 26 may be connected to an actuator device configured to rotate the selector plate 18.

A plurality of flexible control elements 28A, 28B are pivotally connected to the selector plate 18 by the pivot pins 20. For example, the flexible control elements 28A, 28B could be formed of a rubber or other flexible material. A first type 28A of flexible control element and a second type 28B of flexible control element are alternatively disposed between the inner and outer races 12, 14 in the channel 16 therebetween. The first type 28A of control element has a wide portion 30A disposed adjacent to the inner edge 32 of the outer race 14 and a narrow portion 34A disposed adjacent to an outer edge 36 of the inner race 12. The second type 28B of control element has a narrow portion 38B disposed adjacent to the inner edge 32 of the outer race 14 and a wide portion 40B disposed adjacent to the outer edge 36 of the inner race 12. In the illustrated embodiment, the first type 28A of control element is wider than the second type 28B of control element. Each control element 28A, 28B has a first convex side 42A, 42B and a second convex side 44A, 44B. Each pivot pin 20 connects one of the control elements 28A, 28B to the selector plate 18.

A plurality of forward sprag elements 46A and reverse sprag elements 46B is disposed between the inner and outer races 12, 14. Each sprag element 46A, 46B is disposed adjacent to a control element 28A, 28B. In the illustrated embodiment, the forward sprag elements 46A, which constitute a first half of the sprag elements 46A, 46B, are configured to tilt with a first "forward" orientation with respect to the control elements 28A, 28B. The reverse sprag elements 46B, which constitute a second half of the sprag elements 46A, 46B, are configured to tilt with a second "reverse" orientation with respect to the control elements 28A, 28B. Each sprag element 46A, 46B has a first concave side 48A, 48B and a second concave side 50A, 50B.

The forward sprag elements 46A and the reverse sprag elements 46B are disposed alternatively with each other, such that each forward sprag element 46A is disposed adjacent to a reverse sprag element 46B, with a control element 28A, 28B disposed between each forward and reverse sprag element 46A, 46B. Thus, viewing the sprag elements 46A, 46B in order around the circumference of the inner and outer races 12, 14, a second concave side 50A of a forward sprag element 46A is disposed adjacent to and contacting a first convex side 42A of the first type 28A of control element; the second convex side 44A of the first type 28A of control element is disposed adjacent to and contacting the first concave side 48B of a reverse sprag element 46B; the second concave side 50B of the reverse sprag element 46B is disposed adjacent to and contacting the first convex side 42B of a second type 28B of control element; the second convex side 44B of the second type 28B of control element is disposed adjacent to and contacting the first concave side 48A of another forward sprag element 46A, and so on around the circumference of the races 12, 14. In other words, the order of the elements around the circumferences is: forward sprag element 46A, first type of control element 28A, reverse sprag element 46B, second type of control element 28B, and repeated around the entire circumferences of the first and second races 12, 14, in this embodiment.

The outer race 14 has a set of integrated pins 52 extending from a surface of the outer race 14, which hold each of the control elements 28A, 28B to the outer race 14. In the alternative, the pins 52 could be connected to the first race 12, instead of the second race 14, to hold the control elements 28A, 28B to the first race 12. By virtue of the control elements 28A, 28B being pinned to the outer race 14, the forward and reverse sprag elements 46A, 46B are continuously fixed for common rotation with the outer race 14. In the alternative, the sprag elements 46A, 46B could be fixed for common rotation with the inner race 12.

The selector plate 18 is rotatable a short distance in the clockwise and counterclockwise directions about a central axis C, with respect to the inner and/or outer race 12, 14. For example, the selector plate 18 may be rotated radially about the central axis C in the counterclockwise direction, forcing the forward sprag elements 46A to "stand up" and engage the inner race 12. The selector plate 18 may be rotated about the central axis C in a clockwise direction so that the sprag elements 46A, 46B are isolated from the inner race 12, such that the inner race 12 may rotate with respect to the outer race 14.

Thus, the sprag elements 46A, 46B are selectively interconnectable with the inner race 12, in this embodiment. The selector plate 18 is configured to be rotated in a first direction A to decouple the sprag elements 46A, 46B from the inner race 12, and the selector plate 18 is configured to be rotated in a second direction B to couple the inner and outer races 12, 14 together. The second direction B is opposite the first direction A. As illustrated in FIG. 1A, the first direction A is a clockwise direction, and the second direction B is a counterclockwise direction; however, it should be understand that the first direction A could alternatively be a counterclockwise direction, and the second direction B could be a clockwise direction. In addition, it should be understood, that the sprag elements 46A, 46B could be selectively interconnectable with the outer race 14 and continuously connected to the inner race 12, in another embodiment.

Figure 2A:
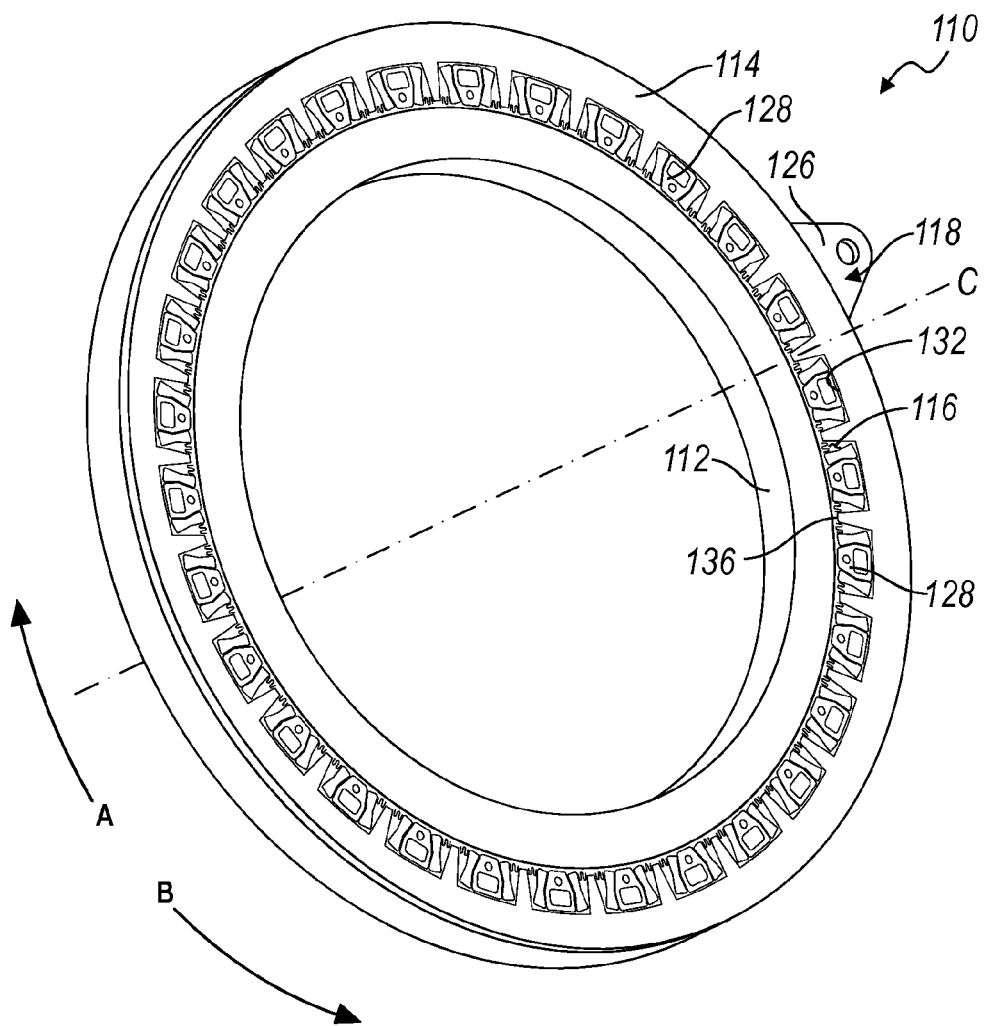
FIG. 2A is a perspective view of a first side of another torque transmitting mechanism according to the principles of the present disclosure.
Figure 2B:
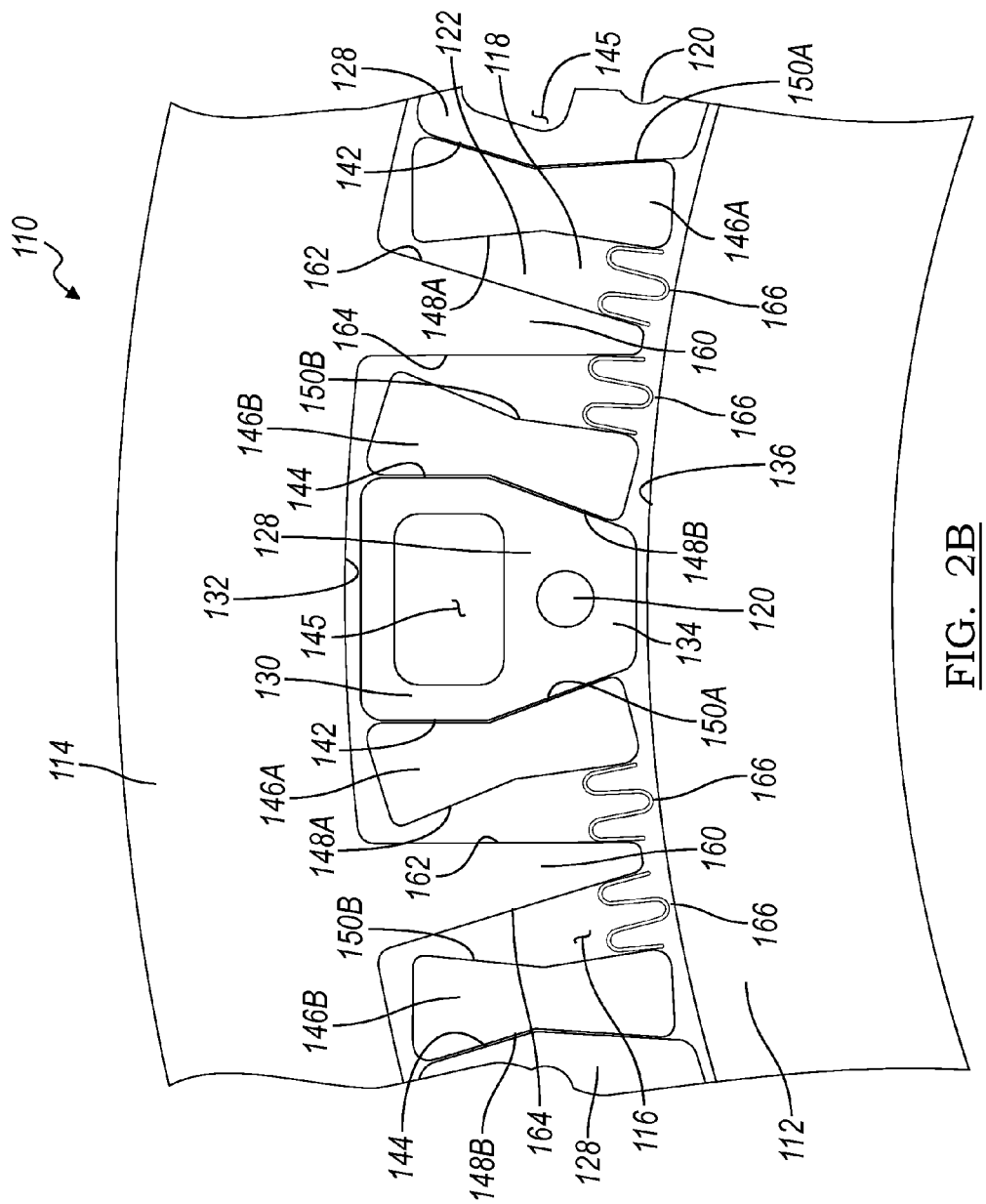
FIG. 2B is a side view of a portion of the first side of the torque transmitting mechanism of FIG. 2A, in accordance with the principles of the present disclosure.
Figure 2C:
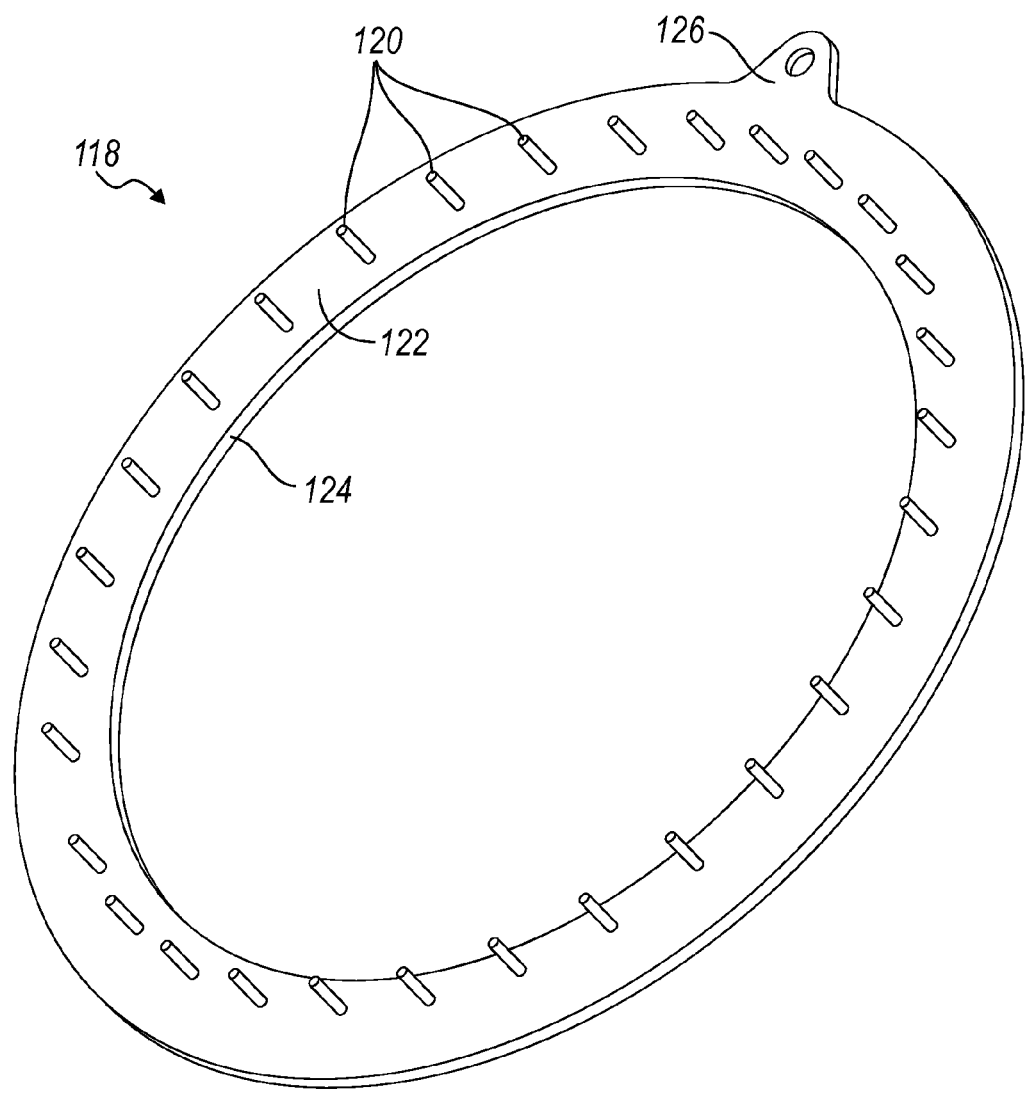
FIG. 2C is a perspective view of a selector plate of the torque transmitting mechanism of FIGS. 2A-2B, according to the principles of the present disclosure.

With reference now to FIGS. 2A-2C, a variation of a selectable one-way torque transmitting mechanism or device is schematically and cross-sectionally illustrated and generally designated at 110. The selectable one-way torque transmitting mechanism 110 has many similarities to the torque transmitting device 10 described above. Accordingly, one having ordinary skill in the art should understand that the details described above with respect to the torque transmitting device 10 may be applied as part of the torque transmitting device 110. For example, the torque transmitting device 110 may be used as a clutch or a brake in an automotive transmission.

The torque transmitting mechanism 110 includes an annular inner race 112 and an outer race 114 disposed radially outward from the inner race 112. The outer race 114 is disposed concentrically around the inner race 112. The outer race 114 also has a generally annular shape. The inner and outer annular races 112, 114 define an annular channel 116 therebetween.

A selector, such as a selector plate 118, is disposed adjacent to the inner and outer annular races 112, 114. The selector plate 118 may be located generally between the inner and outer races 112, 114, or in the channel 116 defined between the inner and outer races 112, 114. The selector plate 118 is movable with respect to the inner and outer races 112, 114.

The selector plate 118 has a generally annular shape. A plurality of plate pivot pins 120 extend from a face 122 of the selector plate 118. In the illustrated embodiment, the pivot pins 120 are spaced apart adjacent to an inner edge 124 of the annular selector plate 118, along the inner circumference of the selector plate 118. A tab 126 may extend from the selector plate 118 for moving the selector plate 118 with respect to the inner and outer races 112, 114. For example, the selector plate 118 may be rotated slightly about a central axis C, which will be described in further detail below. The tab 126 may be connected to an actuator device configured to rotate the selector plate 118.

A plurality of flexible control elements 128 are pivotally connected to the selector plate 118 by the pivot pins 120. For example, the flexible control elements 128 could be formed of a rubber or other flexible material. The flexible control elements 128 are disposed between the inner and outer races 112, 114 in the channel 116 therebetween. Each control element 128 has a wide portion 130 disposed adjacent to the inner edge 132 of the outer race 114 and a narrow portion 134 disposed adjacent to an outer edge 136 of the inner race 112. Each control element 128 has a first convex side 142 and a second convex side 144. A hollowed out area 145 may be formed in the wide portion 130 of each control element 128. Each pivot pin 120 connects one of the control elements 128 to the selector plate 118.

A plurality of forward sprag elements 146A and reverse sprag elements 146B is disposed between the inner and outer races 112, 114. Each sprag element 146A, 146B is disposed adjacent to a control element 128 in the channel 116. In the illustrated embodiment, the forward sprag elements 146A, which constitute a first half of the sprag elements 146A, 146B, are configured to tilt with a first "forward" orientation with respect to the control elements 128. The reverse sprag elements 146B, which constitute a second half of the sprag elements 146A, 146B, are configured to tilt with a second "reverse" orientation with respect to the control elements 128. Each sprag element 146A, 146B has a first concave side 148A, 148B and a second concave side 150A, 150B.

The forward sprag elements 146A and the reverse sprag elements 146B are disposed alternatively with each other, such that each forward sprag element 146A is disposed adjacent to a reverse sprag element 146B, with a control element 128 disposed between each first and second sprag element 146A, 146B.

The outer race 114 has a plurality of extensions 160 extending into the channel 116 from the inner edge 132 of the outer race 114. It should be understood, however, that the extensions 160 could alternatively extend from the inner race 112. Each extension 160 has a forward sprag element 146A disposed on a first side 162 of the extension 160 and a reverse sprag element 146B disposed on a second side 164 of the extension 160. A pair of springs 166 is disposed in the channel 116 adjacent to each extension 160. Each spring 166 extends between a side 162, 164 of the extension 160 and one of the sprag elements 148A, 148B.

Viewing the sprag elements 146A, 146B in order around the circumference of the inner and outer races 112, 114, a second concave side 150B of a reverse sprag element 146B is disposed adjacent to a second side 164 of an extension 160, with a spring 166 extending between and contacting each of the second concave side 150B of the reverse sprag element 146B and the second side 164 of the extension 160; a first side 162 of the extension 160 is disposed adjacent to a first concave side 148A of a forward sprag element 146A, with a spring 166 extending between and contacting each of the first side 162 of the extension 160 and the first concave side 148A of the forward sprag element 146A; a second concave side 150A of the first sprag element 146A disposed adjacent to and contacting a first convex side 142 of a control element 128; a second convex side 144 of the control element 128 disposed adjacent to and contacting a first concave side 148B of another reverse sprag element 148B; and so on around the circumference of the races 112, 114. In other words, the order of the elements around the circumference of the inner race 112 is: reverse sprag element 146B, spring 166, extension 160, spring 166, forward sprag element 146A, control element 128A, and repeated around the entire circumference of the inner races 112, in this embodiment.

Instead of having integrated pins 52 connecting the control elements 128 to the outer race 114, the outer race 114 locates the sprag elements 146A, 146B, springs 166 and a control element 128 in a pocket formed by the extensions 160, the inner edge 132 of the outer race 114, and the outer edge 136 of the inner race 112. In the alternative, the extensions 160 could extend from the outer edge 136 of the inner race 112 to form the pockets. By virtue of the control elements 128A and sprag elements 146A, 146B being trapped in pockets formed in part by extensions 160 of the outer race 114, the forward and reverse sprag elements 146A, 146B are continuously fixed for common rotation with the outer race 114. In the alternative, the sprag elements 146A, 146B could be fixed for common rotation with the inner race 112.

The selector plate 118 is rotatable a short distance about a central axis C in the clockwise and counterclockwise directions, with respect to the inner and/or outer race 112, 114. For example, the selector plate 118 may be rotated radially about the central axis C in the counterclockwise direction, forcing the forward sprag elements 146A to "stand up" and engage the inner race 112. The selector plate 118 may be rotated about the central axis C in a clockwise direction so that the sprag elements 146A, 146B are isolated from the inner race 112, such that the inner race 112 may rotate with respect to the outer race 114.

Thus, the sprag elements 146A, 146B are selectively interconnectable with the inner race 112, in this embodiment. The selector plate 118 is configured to be rotated in a first direction A to decouple the sprag elements 146A, 146B from the inner race 112, and the selector plate 118 is configured to be rotated in a second direction B to couple the inner and outer races 112, 114 together. The second direction B is opposite the first direction A. As illustrated in FIG. 2A, the first direction A is a clockwise direction, and the second direction B is a counterclockwise direction; however, it should be understand that the first direction A could alternatively be a counterclockwise direction, and the second direction B could be a clockwise direction about the central axis C. In addition, it should be understood, that the sprag elements 146A, 146B could be selectively interconnectable with the outer race 114 and continuously connected to the inner race 112, in another embodiment.

In a transmission, the inner and outer races 12, 112, 14, 114 would each be coupled to other components, such as shafts, such that when the races 12, 14, 112, 114 are coupled together, torque is transmitted between the shafts connected to the races 12, 14, 112, 114. In the embodiments of FIGS. 1A-2C, the outer race 14, 114 and the sprag elements 46A, 46B, 146A, 146B are permanently coupled to a first component, and the inner race 12, 112 is permanently coupled to a second component. The inner race 12, 112 may be coupled to the outer race 14, 114 and the sprag elements 46A, 46B, 146A, 146B when the selector plate 18, 118 is rotated.

The description of the invention is merely exemplary in nature and variations that do not depart from the gist of the invention are intended to be within the scope of the invention. Such variations are not to be regarded as a departure from the spirit and scope of the invention. For example, the various features shown and described may be combined in any suitable manner.

What is claimed is:

1. A torque transmitting device for use in an automotive transmission, the torque transmitting device comprising:
   an inner annular race;
   an outer annular race disposed concentrically around the inner annular race;
   a selector plate disposed adjacent to the inner and outer annular races, the selector being movable with respect to the inner and outer races, and wherein the selector is configured to be rotated in a first direction to decouple the sprag elements from one of the outer and inner races, the selector being configured to be rotated in a second direction to couple the inner and outer races together, the second direction being opposite the first direction;
   a plurality of control elements pivotally connected to the selector, the control elements being disposed between the inner and outer races, and wherein the control elements are flexible;
   a plurality of plate pivot pins, each plate pivot pin connecting a control element of the plurality of control elements to the selector plate; and
   a plurality of sprag elements disposed between the inner and outer races, each sprag element has a first concave side and a second concave side, the concave sides being disposed adjacent to control elements of the plurality of control elements, each sprag element being disposed adjacent to a control element of the plurality of control elements, and wherein the plurality of spraq elements are continuously fixed for common rotation with one of the inner and outer races, the plurality of spraq elements being selectively interconnectable with the other of the inner and outer races; and
   wherein each control element has a first convex side and a second convex side, each of the convex sides being disposed adjacent to one of the first and second concave sides of the spraq elements.

2. The torque transmitting device of claim 1, wherein each first and second concave side of the plurality of sprag elements contacts one of the first and second convex sides of the plurality of control elements.

3. The torque transmitting device of claim 2, further comprising a plurality of race pivot pins, each race pivot pin connecting a control element of the plurality of control elements to one of the inner and outer races.

4. The torque transmitting device of claim 3, wherein the plurality of sprag elements are continuously fixed for common rotation with the outer race, the plurality of sprag elements being selectively interconnectable with the inner race.

5. The torque transmitting device of claim 4, wherein each race pivot pins connects a control element of the plurality of control elements to the outer race.

6. A torque transmitting device for use in an automotive transmission, the torque transmitting device comprising:
   an inner annular race;
   an outer annular race disposed concentrically around the inner annular race;
   a selector plate disposed adjacent to the inner and outer annular races, the selector plate being movable with respect to the inner and outer races;
   a plurality of flexible control elements pivotally connected to the selector plate, each control element being disposed between the inner and outer races, each control element having a first convex side and a second convex side;

a plurality of plate pivot pins, each plate pivot pin connecting a control element of the plurality of control elements to the selector plate;

a plurality of race pivot pins, each race pivot pin connecting a control element of the plurality of control elements to one of the inner and outer races; and a plurality of sprag elements disposed between the inner and outer races, each sprag element being disposed adjacent to a control element of the plurality of control elements, the plurality of sprag elements being continuously fixed for common rotation with one of the inner and outer races, the plurality of sprag elements being selectively interconnectable with the other of the inner and outer races, each sprag element having a first concave side and a second concave side, each of the first and second convex sides of the control elements being disposed adjacent to and contacting one of the first and second concave sides of the sprag elements, wherein the selector plate is configured to be rotated in a first direction to decouple the sprag elements from one of the outer and inner races, the selector plate being configured to be rotated in a second direction to couple the inner and outer races together, the second direction being opposite the first direction.

\* \* \* \* \*